(12) United States Patent
Dammann et al.

(10) Patent No.: US 6,706,414 B1
(45) Date of Patent: Mar. 16, 2004

(54) LIQUID UNCROSSLINKED MICHAEL ADDITION OLIGOMERS PREPARED IN THE PRESENCE OF A CATALYST HAVING BOTH AN EPOXY MOIETY AND A QUATERNARY SALT

(75) Inventors: Laurence G. Dammann, Powell, OH (US); Michael L. Gould, Powell, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/255,541

(22) Filed: Sep. 26, 2002

(51) Int. Cl.$^7$ .......................... B32B 27/42; C08L 61/00
(52) U.S. Cl. ................ 428/524; 428/500; 428/413; 525/471; 525/539; 522/135; 522/142; 522/146; 528/220
(58) Field of Search .................. 428/413, 500, 428/524; 525/471, 539; 522/135, 142, 146; 528/220

(56) References Cited

U.S. PATENT DOCUMENTS

| | | | |
|---|---|---|---|
| 5,565,525 A | 10/1996 | Morimoto et al. | 525/259 |
| 5,945,489 A | 8/1999 | Moy et al. | 525/471 |
| 5,959,028 A * | 9/1999 | Irie et al. | 525/10 |
| 6,025,410 A | 2/2000 | Moy et al. | 522/182 |

OTHER PUBLICATIONS

"Polymer network formation by Michael reaction of multifunctional acetoacetates with multifunctional acrylates" Norbert Moszner and Volker Rheinberger, *Macrumol, Rapid Commun*, 16, 135–138 (1995).

* cited by examiner

Primary Examiner—Hobert Dawson
Assistant Examiner—Michael J Feely
(74) Attorney, Agent, or Firm—Martin Connaughton

(57) ABSTRACT

The uncrosslinked liquid oligomeric compositions of this invention are made by the Michael addition reaction of acetoacetate-functional donor compounds with multifunctional acrylate acceptor compounds where the equivalent ratios of multifunctional acrylate to acetoacetate vary from $\geq 1:1$ to $\geq 13.2:1$ depending on the functionality of both multifunctional acrylate and acetoacetate in the presence of a catalyst comprising an epoxy moiety and a quaternary salt. Unusable gelled or cured oligomer products occur below the claimed ranges. The liquid oligomers of this invention are further crosslinked to make coatings, laminates and adhesives.

24 Claims, 1 Drawing Sheet

Figure 1:
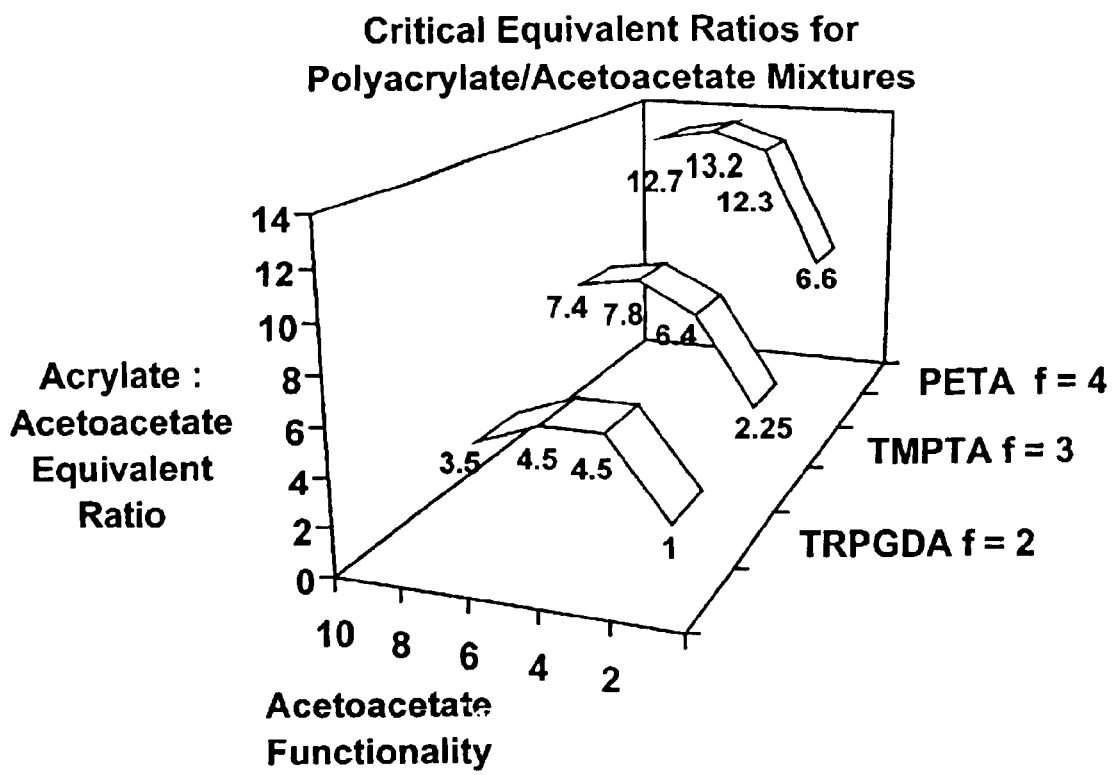

LIQUID UNCROSSLINKED MICHAEL ADDITION OLIGOMERS PREPARED IN THE PRESENCE OF A CATALYST HAVING BOTH AN EPOXY MOIETY AND A QUATERNARY SALT

FIELD OF THE INVENTION

This invention relates to uncrosslinked liquid oligomers containing polymerizable groups that can be crosslinked using ultraviolet (UV) light without adding costly photoinitiators. The uncrosslinked liquid Michael Addition oligomers are prepared in the presence of catalysts having both an epoxy moiety and a quaternary salt. The uncrosslinked liquid Michael Addition oligomers prepared using the desired catalyst have lower viscosities and lower resin colors, and on crosslinking, lower film color than the same uncrosslinked liquid Michael Addition oligomers prepared in the presence of catalysts commonly used for such purposes.

BACKGROUND OF THE INVENTION.

The Michael Addition of beta-dicarbonyl donor compounds to multiacrylate acceptor compounds to make crosslinked polymers has been described in the literature. For example, Mozner and Rheinberger reported the Michael addition of acetoacetates to triacrylates and tetraacrylates (Macromolecular Rapid Communications 16, 135–138, 1995). The products formed were crosslinked (cured) gels. In one of the reactions, Mozner added one mole of trimethylol propane triacrylate (TMPTA) having 3 functional groups to one mole of polyethylene glycol (600 molecular weight) diacetoacetate (PEG-600-DM), having two functional groups. (Each "acetoacetate functional group" reacts twice; thus each mole of diacetoacetate has four reactive equivalents.)

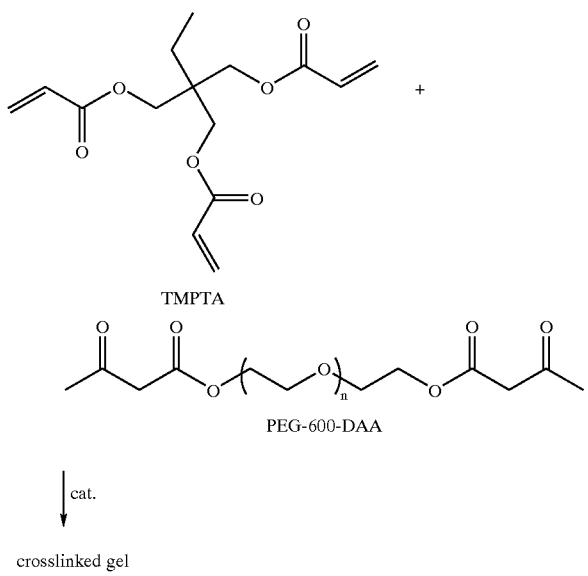

Mole Ratio of TMPTA:PEG 600 DAA=1:1
Ratio of acrylate:acetoacetate functional groups=3:2
Ratio of reactive equivalents=3:4

U.S. Pat. Nos. 5,945,489 and 6,025,410 issued to Ashland Inc. disclose uncrosslinked liquid oligomeric compositions made by the Michael Addition reaction of acetoacetate functional donor compounds with multifunctional acrylate acceptor compounds in the presence of strong base catalysts such as diazabicycloundecene, diazabicyclononane and gaunidines. The contents of U.S. Pat. Nos. 5,945,489 and 6,025,410 are incorporated herein by reference. U.S. Pat. No. 5,565,525 discloses resin compositions curable through the Michael Addition reaction. The crosslinking reaction is catalyzed with a quaternary ammonium compound or other onium salt in the presence of an epoxide. The product of the Michael Addition reaction according to U.S. Pat. No. 5,565,525 is a cured, crosslinked composition and similar to compositions described in "Macromolecular Rapid Communications" in that they form solids.

In contrast according to the invention it has been found that liquid, oligomeric acrylic compositions can be prepared via the Michael Addition reaction in the presence of a catalyst system comprising an epoxide moiety and a quaternary salt.

SUMMARY OF THE INVENTION

This invention is the discovery that certain liquid uncrosslinked acrylic oligomers prepared via the Michael Addition reaction, using Michael donors such as beta keto esters and Michael acceptors such as acrylates, in specified ratios and in the presence of a catalyst system having an epoxy moiety and a quaternary salt, results in uncrosslinked liquid Michael Addition acrylic oligomers having lower viscosity and lower color compared to Michael Addition oligomers prepared in the presence of strong base catalysts. The oligomers of the present invention are photopolymerizable in the absence of photoinitiators. Polymerized (cured) films are lower in color than those produced from resins made with strong bases and color stability upon exposure to elevated temperatures and/or UV radiation (i.e., sunlight) is greatly enhanced.

DESCRIPTION OF THE DRAWING(S)

FIG. 1. The area below the three curves represents ratios of acrylate to acetoacetate that when reacted, form unusable gelled materials outside the scope of the invention. Ratios of acrylate to acetoacetate on or above the curves form the liquid oligomers of this invention.

DETAILED DESCRIPTION OF THE INVENTION

The present invention relates to Michael Addition uncrosslinked liquid polyacrylate oligomers prepared by reacting Michael donors with Michael acceptors. The reaction is carried out in the presence of a catalyst system suitable for promoting the reaction of a beta-dicarbonyl donor with a compound having multiple acrylate functionalities at low temperatures over short time frames with no required byproduct removal or work-up. The catalyst system used in the present invention comprises an epoxy moiety and a quaternary salt.

Among the common Michael acceptors used to make the oligomers of this invention are multiacrylates such as diacrylates, triacrylates, and tetraacrylates.

Examples of useful diacrylates are:

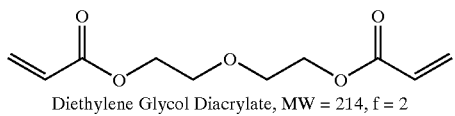

Diethylene Glycol Diacrylate, MW = 214, f = 2

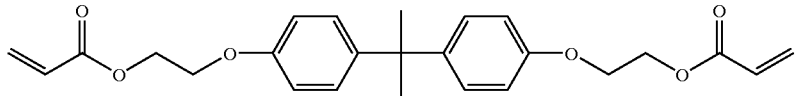

Ethoxylated Bisphenol A Diacrylate, MW = 424, f = 2

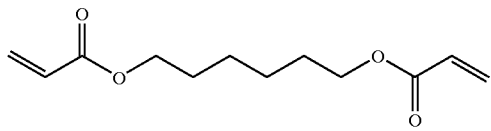

1,6-Hexanediol Diacrylate, MW = 226, f = 2

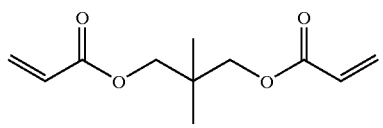

Neopentyl Glycol Diacrylate, MW = 212, f = 2

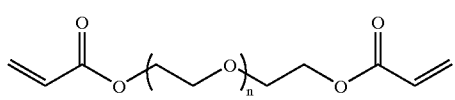

Polyethylene Glycol Diacrylate, MW = 302, 508, f = 2

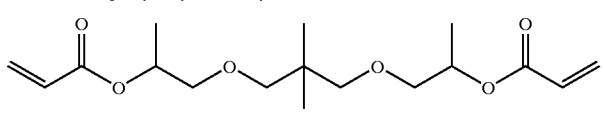

Propoxylated Neopentyl Glycol Diacrylate, MW = 328, f = 2

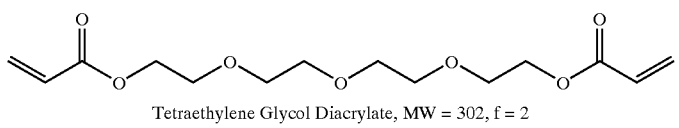

Tetraethylene Glycol Diacrylate, MW = 302, f = 2

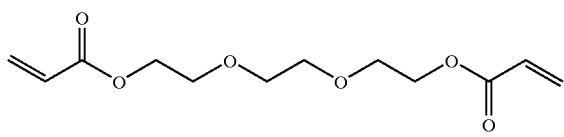

Triethylene Glycol Diacrylate, MW = 258, f = 2

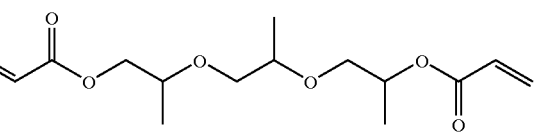

Tripropylene Glycol Diacrylate (TRPGDA), MW = 300, f = 2

Useful triacrylates are:

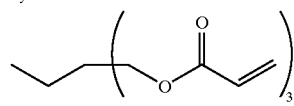

Trimethylolpropane Triacrylate (TMPTA), MW = 296, f = 3

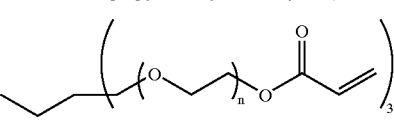

Ethoxylated Trimethylolpropane Triacrylate, MW = ≥ 428, f = 3

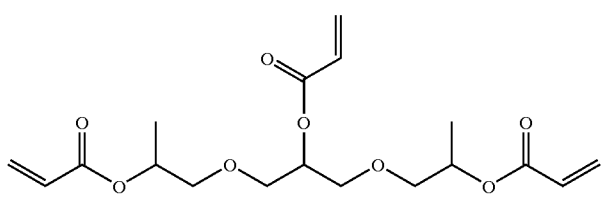

Propoxylated Glyceryl Tricrylate, MW = 428, f = 3

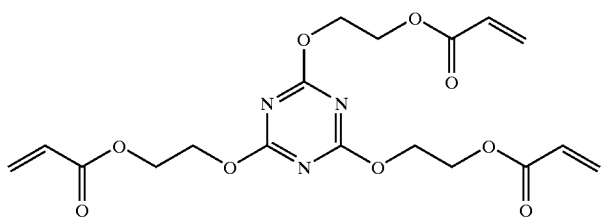

Tris (2-Hydroxy Ethyl) Isocyanurate Triacrylate, MW = 423, f = 3

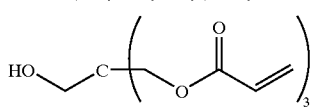

Penyaerythritol Triacrylate, MW = 298, f = 3

A useful tetraacrylate is 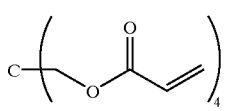

Pentaerythritol Tetraacrylate (PETA), MW = 352, f = 4

Additional useful acrylate acceptors are acrylated epoxies, such as acrylated epoxy diacrylates, acrylated urethanes, such as aryl and aliphatic urethane acrylates, and acrylated polyesters, such as polyester acrylates. Also, monofunctional acrylates (e.g., simple $C_1$–$C_{18}$ acrylate ester, isobornyl acrylate, ethyl hexyl acrylate, lauryl acrylate, hydroxyethyl acrylate, caprolactone acrylate, etc.) may be included to modify resin properties such as adhesion to specific substrates, toughness, flexibility, film gloss, solvent resistance, impact resistance, surface tension and others.

Examples of Michael donors used to make the oligomers of this invention are acetoacetates having a functionality of two:

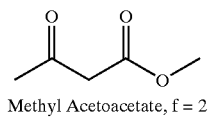
Methyl Acetoacetate, f = 2

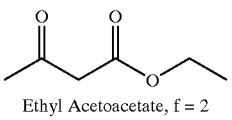
Ethyl Acetoacetate, f = 2

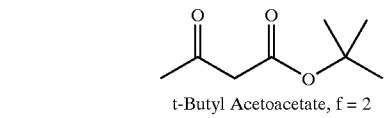
t-Butyl Acetoacetate, f = 2

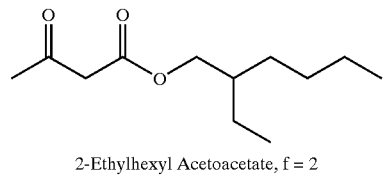
2-Ethylhexyl Acetoacetate, f = 2

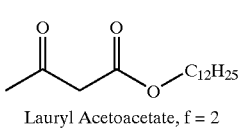
Lauryl Acetoacetate, f = 2

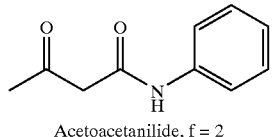
Acetoacetanilide, f = 2

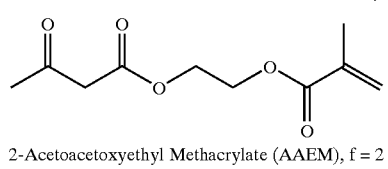
2-Acetoacetoxyethyl Methacrylate (AAEM), f = 2

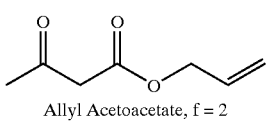
Allyl Acetoacetate, f = 2

Acetoacetates having a functionality of four:

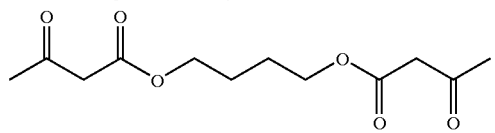
Butanediol Diacetoacetate, f = 4

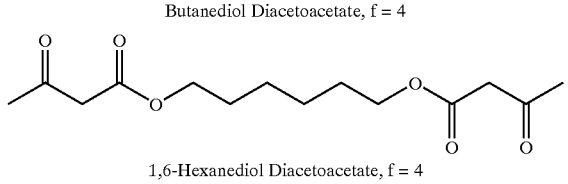
1,6-Hexanediol Diacetoacetate, f = 4

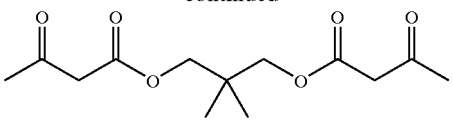
Neopentyl Glycol Diacetoacetate, f = 4

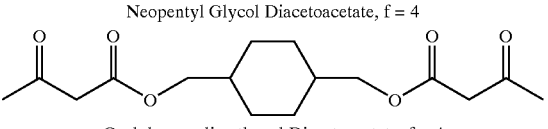
Cyclohexanedimethanol Diacetoacetate, f = 4

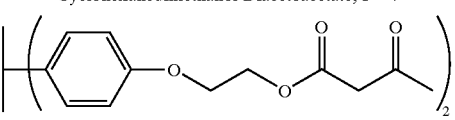
Ethoxylated Bisphenol A Diacetoacetate, f = 4

Acetoacetates having a functionality of six:

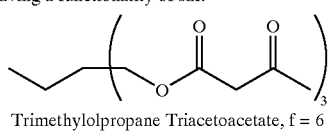
Trimethylolpropane Triacetoacetate, f = 6

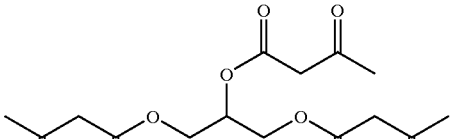
Glycerin triacetoacetate, f = 6

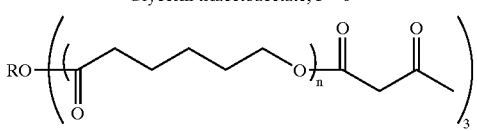
Polycaprolactone triacetoacetate, f = 6

An acetoacetate having a functionality of eight is:

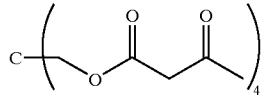
Pentaerythritol Tetraacetoacetate, f = 8

Other useful Michael donors include esters of malonic acid, 2,4-pentanedione, methyl cyanoacetate, ethyl cyanoacetate, butyl cyanoacetate, octyl cyanoacetate and cyanoacetamide.

The Michael Addition reaction is typically carried out with an equivalent excess of Michael acceptor to Michael donor. Workable ratios to produce liquid oligomeric products are defined in FIG. 1. It is critical that an appropriate equivalent ratio of acceptor to donor is used in order to ensure that a liquid oligomeric product is obtained. Examples of these ratios for acrylate acceptors and Michael donors include the following.

Where the reactive equivalent functional ratios are:
a) diacrylate:Michael donor of
  $\geq$1:1 where the donor functionality=2
  $\geq$4.5:1 where the donor functionality=4
  $\geq$4.5:1 where the donor functionality=6,
  $\geq$3.5:1 where the donor functionality=8,
b) triacrylate:Michael donor of
  $\geq$2.25:1 where the donor functionality=2
  $\geq$6.4:1 where the donor functionality=4, ≧7.8:1 where the donor functionality=6,
≧7.4:1 where the donor functionality=8,
c) tetraacrylate:Michael donor of
≧6.6:1 where the donor functionality=2
≧12.3:1 where the donor functionality=4
≧13.2:1 where the donor functionality=6
≧12.7:1 where the donor functionality=8.

The catalyst system used in the present invention comprises an epoxy moiety and a quaternary salt. Examples of epoxy moiety-containing compositions useful in the invention include glycidyl methacrylate, trimethylolpropane triglycidyl ether, diglycidyl ether of bisphenol A and the like. The quaternary salts include tetraalkyl ammonium halides such as tetrabutylammonium bromide, arylalkyl ammonium halides such as benzyltriethylammonium chloride and the like. The quaternary salts also include phosphonium halides such as tetraalkyl phosphonium bromides and phosphonium acetates, such as ethyltriphenylphosphonium acetate acetic acid complex such as "A-1" catalyst from Morton International. The quaternary salts also include ammonium, phosphonium or sulfonium fluorborate.

Preferred ranges for the epoxy and quaternary salt are 0.10–10% and 0.10–5% by weight, respectively, based on the total acrylate and Michael donor charge. Most preferred ranges would be 0.10–5% and 0.10–2% by weight, respectively. Resin design is application specific and a wide range of epoxy and quaternary salt moiety is possible on that basis as the catalyst constituents can directly influence properties of cured films.

While not wishing to be bound by theory, it is believed that when the epoxy and quaternary salt are added as separate components the epoxy and quaternary salt react to form the catalyst in-situ. In another embodiment, the epoxy moiety and quaternary salt may be present in one molecule. An example would be the reaction product of triethylamine and epichlorohydrin. In another embodiment the catalyst can be derived from a quaternary salt with both epoxy and polymerizable ligand functionality. An example is acryloylethyl glycidyl dimethylammonium chloride. The polymerizable ligand allows for the binding of that composition with the cured product matrix by co-polymerization with other acrylic functional groups.

The high selectivity of the Michael reaction permits the use of monomers such as styrene and methyl methacrylate as inert solvents to give low-viscosity systems that are easily incorporated into a variety of resins.

The liquid Michael Addition products of the present invention are curable by ultraviolet light without the need of a photoinitiator and are useful as coatings, adhesives, sealants and encapsulants for a variety of substrates and applications. Photoinitiators such as benzophenone and/or 2,2-dimethoxy-2-phenyl acetophenone may be added to these resins to further enhance curing. The oligomers of the present invention may also be cured by chemical or thermal means and electron beam radiation.

The following series of experiments provides examples of proportions of multifunctional-acrylate to β-dicarbonyl Michael donor, which separate the liquid oligomer products of this invention from the gel or solid products of the prior art. In the following Examples all parts are by weight unless otherwise indicated.

EXAMPLE 1

Trimethylolpropane triacrylate (TMPTA), 74.0 g, ethyl acetoacetate (EAA), 14.8 g, glycidyl methacrylate (GMA) epoxy monomer, 1.8 g and tetrabutylammonium bromide, 0.45 g, were combined in a reactor with moderate agitation from a mechanical stirrer. The reactor contents were heated at approximately 1° C./min to the prescribed run temperature of 80° C. and held for a three-hour period. After three hours, the resin was discharged from the reactor and allowed to cool. Twenty-four hours after discharge, resin viscosity was measured at 25° C. with a Brookfield Cap 2000 viscometer and determined to be 10,390 cps. Conversion of both reactive methylene protons on ethyl acetoacetate was determined to be 95.2% by $^{13}$C NMR. Color was measured with a Gardner Delta 212 Color Comparator.

| Viscosity (cps, 25° C.) | 10,390 |
|---|---|
| Acetoacetate conversion, % | 95.2 |
| Gardner Color | 3 |

The viscous resin product was applied at a thickness of 2 mils to an aluminum panel and cured "tack-free" by exposure to a Fusion "H" bulb at a dosage of 500 mJ/cm$^2$. The cured coating was smooth, glossy, very hard (pencil hardness 8H) and solvent resistant (>200 MEK double-rubs).

EXAMPLE 2

For sake of comparison, a "traditional" oligomer synthesis is evaluated in example 2. Trimethylol propane triacrylate (TMPTA) 1000.0 g, and 1,8-diazabicyclo[5.4.0]undec-7-ene (DBU), 10.9 g, were combined in a reactor with vigorous agitation from a mechanical stirrer. Ethyl acetoacetate (EAA), 199.8 g, was added dropwise to the stirred acrylate/amine catalyst over approximately 20 minutes beginning at room temperature. The highly exothermic reaction resulted in a peak temperature of 84° C. during addition of EAA with no additional external heating. At the conclusion of EAA addition, the reactor temperature was set to 85° C. and held for a two-hour period. After two hours, the resin was discharged from the reactor and allowed to cool. Twenty-four hours after discharge, resin viscosity was measured at 25° C. with a Brookfield Cap 2000 viscometer. Extent of conversion of reactive methylene protons on ethyl acetoacetate was determined by $^{13}$C NMR.

| Viscosity (cps, 25° C.) | 48,000 |
|---|---|
| Acetoacetate conversion, % | 86.4 |
| Gardner Color | 6 |

As in example 1, the viscous resin product was applied at a thickness of 2 mils to an aluminum panel and cured "tack-free" by exposure to a Fusion "H" bulb at a dosage of 500 mJ/cm$^2$. The cured coating was smooth, glossy, very hard (pencil hardness 8H) and solvent resistant (>200 MEK double-rubs).

EXAMPLE 3 [no epoxy]

Trimethylolpropane triacrylate (TMPTA), 74.0 g, ethyl acetoacetate (EAA), 14.8 g, and tetrabutylammonium bromide, 0.45 g, were combined in an open reactor with moderate agitation from a mechanical stirrer. The reactor contents were heated at approximately 1° C./min to the prescribed run temperature of 80° C. and held for a three-hour period. After three hours, the reactor contents were discharged from the reactor and allowed to cool. Twenty-four hours after discharge, conversion of both reactive methylene protons on ethyl acetoacetate was determined to be 0% by $^{13}$C NMR.

| Viscosity (cps, 25° C.) | 70 |
|---|---|
| Acetoacetate conversion, % | 0 |
| Gardner Color | N/A |

No attempt was made to cure the resulting unreacted monomer mixture.

EXAMPLE 4 [no quat]

Trimethylolpropane triacrylate (TMPTA), 74.0 g, ethyl acetoacetate (EAA), 14.8 g, and glycidyl methacrylate, 1.8 g, were combined in an open reactor with moderate agitation from a mechanical stirrer. The reactor contents were heated at approximately 1° C./min to the prescribed run temperature of 80° C. and held for a three-hour period. After three hours, the reactor contents were discharged from the reactor and allowed to cool. Twenty-four hours after discharge, conversion of both reactive methylene protons on ethyl acetoacetate was determined to be 0% by $^{13}$C NMR.

| Viscosity (cps, 25° C.) | 57 |
|---|---|
| Acetoacetate conversion, % | 0 |
| Gardner Color | N/A |

No attempt was made to cure the resulting unreacted monomer mixture.

EXAMPLE 5

Trimethylolpropane triacrylate (TMPTA), 74.0 g, 2,4-pentanedione, 11.8 g, glycidyl methacrylate, 1.8 g, and tetrabutylammonium bromide, 0.44 g were combined in an open reactor with moderate agitation from a mechanical stirrer. The reactor contents were heated at approximately 1° C./min to the prescribed run temperature of 80° C. and held for a three-hour period. After three hours, the reactor contents were discharged from the reactor and allowed to cool. Twenty-four hours after discharge, conversion of both reactive methylene protons on 2,4-pentanedione was determined to be 93.6% by $^{13}$C NMR.

| Viscosity (cps, 25° C.) | 52,400 |
|---|---|
| 2,4-Pentanedione conversion, % | 93.6 |
| Gardner Color | 5 |

As in examples 1 and 2, the mobile resin product was applied at a thickness of 2 mils to an aluminum panel and cured "tack-free" by exposure to a Fusion "H" bulb at a dosage of 500 mJ/cm$^2$. The cured coating was smooth, glossy, hard and solvent resistant (>200 MEK double-rubs).

EXAMPLE 6

Trimethylolpropane triacrylate (TMPTA), 296.0 g, acetoacetanilide, 80.5 g, glycidyl methacrylate, 7.7 g, and tetrabutylammonium bromide, 1.9 g were combined in an open reactor with moderate agitation from a mechanical stirrer. The reactor contents were heated at approximately 1° C./min to the prescribed run temperature of 80° C. and held for a three-hour period. After three hours, the reactor contents were discharged from the reactor and allowed to cool. Twenty-four hours after discharge, conversion of both reactive methylene protons on acetoacetanilide was determined to be 100% by $^{13}$C NMR.

| Viscosity (cps, 50° C.) | 24,420 |
|---|---|
| Acetoacetanilide conversion, % | 100 |
| Gardner Color | 4 |

The data in Table 1 were derived from the following reaction paradigm:

Trimethylol propane triacrylate (TMPTA), 74.0 g, ethyl acetoacetate (EAA), 14.8 g, epoxy and quaternary "salt" compounds as indicated in Table 1 were combined in a reactor with moderate agitation from a mechanical stirrer. The reactor contents were heated at approximately 1° C./min to the prescribed run temperature shown in Table 1 and held for the time indicated. After the prescribed reaction time, the reactor contents were discharged from the reactor and allowed to cool. Twenty-four hours after discharge, product viscosity was measured at 25° C. and 50° C. with a Brookfield Cap 2000 viscometer. Conversion of ethyl acetoacetate was measured by $^{13}$C NMR. Color was measured by a Gardner Delta 212 Color Comparator.

Raw material key: (Raw materials were supplied by Aldrich Chemical Company, Milwaukee, Wis., except where indicated.)

GMA—glycidyl methacrylate, equivalent weight 142; supplied by The Dow Chemical Company D.E.R.*332—diglycidyl ether of bisphenol A, equivalent weight 174; supplied by The Dow Chemical Company TMPTGE—trimethylolpropane triglycidyl ether, equivalent weight 144; supplied by Dyna Chem, Inc.

UVR 6128—Bis-(3,4-epoxycyclohexyl) adipate, equivalent weight 183; supplied by Union Carbide Corporation TBAB—tetrabutylammonium bromide TBPB—tetrabutylphosphonium bromide BTEAC—benzyltriethylammonium chloride TMSI—trimethylsulfonium iodide TBAHS—tetrabutylammonium hydrogen sulfate TBATFB—tetrabutylammonium tetrafluoroborate ETPPA—ethyltriphenylphosphonium acetate acetic acid complex="A-1"; supplied by Morton International GTMAC—glycidyltrimethylammonium chloride AETMAC—acryloylethyltrimethylammonium chloride

TABLE 1

Conversion of Ethyl Acetoacetate, Resin Viscosity and Color as a Function of Epoxy and Quaternary Moieties, Run Temperature and Run Time

| Epoxy Moiety & Wt. % of Total Reactor Charge | Quat Moiety & Wt. % of Total Reactor Charge | Run Temp. (° C.) | Run Time (hr.) | % Full Conversion of acetoacetate ($^{13}$C NMR) | Dynamic Viscosity (cps, 50° C.) | Resin Color (Gardner Scale) |
|---|---|---|---|---|---|---|
| 80 GMA, 5% | TBAB, 0.5% | 80 | 2.5 | 100 | | 4 |
| 88 GMA, 2% | TBPB, 0.5% | 70 | 4.0 | 73 | | 1 |
| 88 GMA, 2% | TBPB, 0.5% | 70 | 6.0 | 90 | | 1 |
| 93 GMA, 2% | TBAB, 0.5% | 70 | 4.0 | 77 | | 1 |
| 97 GMA, 2% | TBAB, 0.5% | 80 | 4.0 | 100 | | 1 |
| 104 GMA, 2% | TBAB, 0.5% | 80 | 3.0 | 100 | 3305 | 1 |
| 108 GMA, 2% | TBPB, 0.5% | 80 | 3.0 | 94 | 1740 | 1 |
| 111 GMA, 2% | TMSI, 0.5% | 80 | 3.0 | 0 | | |
| 110 GMA, 2% | (none) | 80 | 3.0 | 0 | | |
| 115 GMA, 2% | TBAHS, 0.5% | 80 | 3.0 | 0 | | |
| 116 GMA, 2% | TBATFB, 0.5% | 80 | 3.0 | 0 | | |
| 117 GMA, 2% | ETPPA, 0.5% | 80 | 3.0 | 100 | 10,140 | 4 |
| 118 GMA, 2% | BTEAC, 0.5% | 80 | 3.0 | 100 | 2360 | 3 |
| 138 GMA, 2% | AETMAC, 0.5% | 80 | 3.0 | 88.5 | 2148 | |
| 80 GMA, 1% | TBAB, 0.5% | 60 | 24 | 100 | | 4 |
| 82 GMA, 1% | TBAB, 0.5% | 70 | 3.5 | 76 | | 3 |
| 85 GMA, 1% | TBAB, 0.5% | 70 | 6.0 | 90 | | 1 |
| 114 (none) | TBAB, 0.5% | 80 | 3.0 | 0 | | |
| 148 | GTMAC, 2.5% | 80 | 3.0 | 74 | | |
| 84 D.E.R.* 332, 1% | TBAB, 0.5% | 75 | 4.0 | 78 | | 4 |
| 87 TMPTGE, 1% | TBAB, 0.5% | 70 | 5.0 | 99 | | 3 |
| 134 UVR* 6128 | TBAB, 0.5% | 80 | 3.0 | 43 | | |

*Trademark of the Dow Chemical Company

We claim:

1. A liquid oligomeric composition, comprising an uncrosslinked Michael addition reaction product of;
   a) a diacrylate, triacrylate, and/or tetraacrylate Michael acceptor, and
   b) a Michael donor, having equivalent ratios of
      i) diacrylate:Michael donor of
         $\geq$1:1 where the donor functionality=2
         $\geq$4.5:1 where the donor functionality=4
         $\geq$4.5:1 where the donor functionality=6,
         $\geq$3.5:1 where the donor functionality=8,
      ii) triacrylate:Michael donor of
         $\geq$2.25:1 where the donor functionality=2
         $\geq$6.4:1 where the donor functionality=4,
         $\geq$7.8:1 where the donor functionality=6,
         $\geq$7.4:1 where the donor functionality=8,
      iii) tetraacrylate:Michael donor of
         $\geq$6.6:1 where the donor functionality=2
         $\geq$12.3:1 where the donor functionality=4
         $\geq$13.2:1 where the donor functionality=6
         $\geq$12.7:1 where the donor functionality=8,
where the reaction product of the di-, tri- and/or tetraacrylate acceptor and Michael donor is formed in the presence of a catalyst system comprising an epoxy moiety and a quaternary salt.

2. The composition of claim 1, where the quaternary salt is an ammonium, phosphonium or sulfonium halide, acetate or fluoroborate.

3. The composition of claim 1, where the epoxy moiety is an aryl or aliphatic glycidyl ether, aryl or aliphatic glycidyl ester, common alkylene oxides, cycloaliphatic epoxy, aryl or aliphatic glycidyl sulfide or amine, and aryl or aliphatic thiirane.

4. The composition of claim 1 wherein the diacrylate is ethylene or propylene glycol diacrylate, diethylene or dipropylene glycol diacrylate, triethylene or tripropylene glycol diacrylate, tertraethylene or tetrapropylene glycol diacrylate, polyethylene or polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated or propoxylated neopentyl glycol diacrylate, ethoxylated or propoxylated cyclohexanedimethanol diacrylate, acrylated epoxy diacrylate, aryl and aliphatic urethane diacrylate and polyester diacrylate or mixtures thereof.

5. The composition of claim 1 wherein the triacrylate is: trimethylol propane triacrylate, glycerol triacrylate, ethoxylated or propoxylated trimethylolpropane triacrylate, tris (2-hydroxyethyl) isocyanurate triacrylate, ethoxylated or propoxylated glycerol triacrylate, pentaerythritol triacrylate, aryl and aliphatic urethane triacrylates, melamine triacrylates, epoxy novolac triacrylates or mixtures thereof.

6. The composition of claim 1 wherein the tetraacrylate is pentaerythritol tetraacrylate, ethoxylated or propoxylated pentaerythritol tetraacrylate, dipentaerythritol tetraacrylate, ethoxylated or propoxylated dipentaerythritol tetraacrylate, aryl and aliphatic urethane tetraacrylates, melamine tetraacrylates, epoxy novolac tetraacrylates or mixtures thereof.

7. The composition of claim 1, further comprising a monoacrylate.

8. The composition of claim 7 where the monoacrylate is a simple $C_1$–$C_{18}$ acrylate ester, isobornyl acrylate (IBOA), tetrahydrofurfuryl acrylate (THFFA), 2-(2-ethoxy ethoxy) ethyl acrylate (EOEOEA), phenoxyethyl acrylate (PEA), hydroxyalkyl acrylate, monoalkyl polyalkylene glycol acrylate, siloxane, silane or silicone acrylate, perfluoroalkyl acrylate and/or caprolactone acrylate.

9. The composition of claim 1, wherein the Michael donors having 2 reactive functional groups per molecule are methyl acetoacetate, ethyl acetoacetate, t-butyl acetoacetate, allyl acetoacetate, 2-ethylhexyl acetoacetate, lauryl acetoacetate, acetoacetanilide, 2-acetoacetoxyethyl methacrylate (AAEM), 2,4-pentanedione or mixtures thereof.

10. The composition of claim 1 wherein the Michael donors having 4 functional groups per molecule are 1,4-butanediol diacetoacetate, 1,6-hexanediol diacetoacetate, neopentyl glycol diacetoacetate, cyclohexane dimethanol diacetoacetate, ethoxylated bisphenol A diacetoacetate or mixtures thereof.

11. The composition of claim 1 wherein the Michael donors having 6 functional groups per molecule are trimethylol propane triacetoacetate, glycerol triacetoacetate, polycaprolactone triacetoacetate, ethoxylated or propoxylated trimethylol propane triacetoacetate, ethoxylated or propoxylated glycerol triacetoacetate or mixtures thereof.

12. The composition of claim 1 wherein the Michael donor having 8 functional groups per molecule is pentaerythritol tetraacetoacetate, ethoxylated or propoxylated pentaerythritol tetraacetoacetate or mixtures thereof.

13. The composition of claim 1, wherein the catalyst system comprises glycidyl methacrylate and tetrabutylammonium bromide.

14. The composition of claim 1 wherein said reaction between a Michael donor and an acrylate occurs in the presence of non-reactive monomers.

15. The composition of claim 14 wherein said monomer is styrene, t-butyl styrene, alpha methyl styrene, vinyl toluene, vinyl acetate, allyl acetate, allyl methacrylate, diallyl phthalate, $C_1$–$C_{18}$ methacrylate esters, dimethacrylates, trimethacrylates or mixtures thereof.

16. The composition of claim 1 wherein said Michael donor is an acetoacetate, a malonic ester, pentanedione, acetoacetanilide, o-acetoacetanisidide, o-acetoacetatoluidide, acetoacetamide, N,N-dimethyl acetoacetamide, ethyl cyanoacetate, methyl cyanoacetate, butyl cyanoacetate or mixtures thereof.

17. The composition of claim 1, wherein the epoxy moiety and the quaternary salt are present in one molecule.

18. A crosslinked resin comprising a reaction product of the liquid oligomeric composition of claim 1.

19. The crosslinked resin of claim 18, where the quaternary salt is an ammonium, phosphonium or sulfonium halide, acetate or fluoroborate.

20. The crosslinked resin of claim 18, where the epoxy moiety is an aryl or aliphatic glycidyl ether, aryl or aliphatic glycidyl ester, alkylene oxide, cycloaliphatic epoxy, aryl or aliphatic glycidyl sulfide or amine, and aryl or aliphatic thiirane.

21. A coated article comprising: a substrate and the crosslinked resin of claim 18 coated on said substrate.

22. A method of making a liquid oligomeric composition, comprising the steps of reacting a Michael donor having two, four, six, or eight reactive functional groups per molecule with a Michael acceptor selected from the group consisting of diacrylate, triacrylate, and tetra-acrylate, in the presence of a catalyst system comprising an epoxy moiety and a quaternary salt, where the reactive equivalent functional ratios are:

i) diacrylate:Michael donor of
$\geq$1:1 where the donor functionality=2
$\geq$4.5:1 where the donor functionality=4
$\geq$4.5:1 where the donor functionality=6,
$\geq$3.5:1 where the donor functionality=8,
ii) triacrylate:Michael donor of
$\geq$2.25:1 where the donor functionality=2
$\geq$6.4:1 where the donor functionality=4,
$\geq$7.8:1 where the donor functionality=6,
iii) tetraacrylate:Michael donor of
$\geq$6.6:1 where the donor functionality=2
$\geq$12.3:1 where the donor functionality=4
$\geq$13.2:1 where the donor functionality=6
$\geq$12.7:1 where the donor functionality=8.

23. The method of claim 22, where the quaternary salt is an ammonium, phosphonium or sulfonium halide.

24. The method of claim 22, where the epoxy moiety is an aryl or aliphatic glycidyl ether, aryl or aliphatic glycidyl ester, alkylene oxide, cycloaliphatic epoxy, aryl or aliphatic glycidyl sulfide or amine, and aryl or aliphatic thiirane.

* * * * *